(12) United States Patent
Matsumoto et al.

(10) Patent No.: US 12,472,828 B2
(45) Date of Patent: Nov. 18, 2025

(54) COMPUTER PROGRAM, DETERMINATION DEVICE, AND DETERMINATION METHOD

(71) Applicant: GS Yuasa International Ltd., Kyoto (JP)

(72) Inventors: Yu Matsumoto, Kyoto (JP); Seiji Takai, Kyoto (JP); Eiji Hayashi, Kyoto (JP); Shinichi Namitoko, Kyoto (JP); Masaki Oya, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 267 days.

(21) Appl. No.: 18/247,208

(22) PCT Filed: Aug. 25, 2021

(86) PCT No.: PCT/JP2021/031067
§ 371 (c)(1),
(2) Date: Mar. 30, 2023

(87) PCT Pub. No.: WO2022/070686
PCT Pub. Date: Apr. 7, 2022

(65) Prior Publication Data
US 2023/0382231 A1   Nov. 30, 2023

(30) Foreign Application Priority Data

Oct. 1, 2020 (JP) ................. 2020-167188

(51) Int. Cl.
*B60L 3/12* (2006.01)
*B60L 50/60* (2019.01)
*B60L 58/10* (2019.01)

(52) U.S. Cl.
CPC ............... *B60L 3/12* (2013.01); *B60L 50/60* (2019.02); *B60L 58/10* (2019.02)

(58) Field of Classification Search
CPC .. B60L 3/12; B60L 50/60; B60L 58/10; B60L 3/0046; B60L 3/0061;
(Continued)

(56) References Cited

U.S. PATENT DOCUMENTS

| 4,042,830 A | * | 8/1977 | Kellenbenz | ............ G01R 31/40 703/13 |
| 4,146,825 A | * | 3/1979 | Harhay | ............ H02J 7/02 320/DIG. 22 |

(Continued)

FOREIGN PATENT DOCUMENTS

| JP | 2011-062018 A | 3/2011 |
| JP | 2013-511703 A | 4/2013 |

(Continued)

OTHER PUBLICATIONS

International Search Report and Written Opinion for International Application No. PCT/JP2021/031067, dated Oct. 12, 2021, (8 pages), Japan Patent Office, Tokyo, Japan.

*Primary Examiner* — Rodney A Butler
(74) *Attorney, Agent, or Firm* — Alston & Bird LLP

(57) ABSTRACT

A computer is caused to execute a process of; executing, for a system including an energy storage device and a powered unit driven by power supplied from the energy storage device wherein the energy storage device including a switch for switching between energized and non-energized states and having a switch self-diagnosis function, a simulation regarding switch self-diagnosis using a battery model for simulating the energy storage device and a powered-unit model for simulating the powered unit; and determining compatibility between the energy storage device and the powered unit based on an execution result of the simulation.

13 Claims, 5 Drawing Sheets

(58) Field of Classification Search
CPC ........ H01M 2010/4271; H01M 10/425; Y02E 60/10; Y02T 10/70
See application file for complete search history.

(56) References Cited

U.S. PATENT DOCUMENTS

| | | |
|---|---|---|
| 2012/0283970 A1 | 11/2012 | Boehm |
| 2014/0103883 A1* | 4/2014 | Mitsutani ................ B60L 58/12 320/162 |
| 2021/0239764 A1 | 8/2021 | Jin et al. |

FOREIGN PATENT DOCUMENTS

| | | |
|---|---|---|
| JP | 2019-125250 A | 7/2019 |
| WO | WO-2019/204705 A1 | 10/2019 |

* cited by examiner

COMPUTER PROGRAM, DETERMINATION DEVICE, AND DETERMINATION METHOD

CROSS REFERENCE TO RELATED APPLICATIONS

This application is a National Stage Application, filed under 35 U.S.C. § 371, of International Application No. PCT/JP2021/031067, filed Aug. 25, 2021, which international application claims priority to and the benefit of Japanese Application No. 2020-167188, filed Oct. 1, 2020; the contents of both of which as are hereby incorporated by reference in their entireties.

BACKGROUND

Technical Field

The present invention relates to a computer program, a determination device, and a determination method.

Description of Related Art

A battery and a charge system for charging the battery are mounted on a vehicle such as an electric vehicle (EV) or a hybrid electric vehicle (HEV) (see, for example, Patent Document JP-A-2011-062018).

The battery mounted on a vehicle is provided with a relay that cuts off a charge-discharge path when an abnormality such as overcharge or overdischarge occurs. The battery performs relay self-diagnosis by opening and closing the relay at the timing when charging and discharging are not performed. This is for diagnosing whether or not the relay normally functions in the event that an abnormality occurs.

The battery is provided with a current sensor that detects a current flowing inside the battery. The battery performs current calibration for calibrating the current sensor based on, for example, a current (dark current) detected in a zero-load state.

BRIEF SUMMARY

When the specification of the vehicle and the specification of the battery mounted on the vehicle do not match, the relay self-diagnosis or the current calibration may not normally function. If such a mismatch is found at the stage of comprehensive verification of the vehicle system, in which the battery is actually mounted, reviewing the specifications of the charge-discharge system or changing the type of battery mounted on the vehicle is required, thus causing a problem that the agreement of specifications cannot be reached early.

An object of the present invention is to provide a computer program, a determination method, and a determination device for determining the success or failure of relay self-diagnosis and current calibration by simulation.

A computer program causes a computer to execute a process of: executing, for a system including an energy storage device and a powered unit driven by power supplied from the energy storage device wherein the energy storage device including a switch for switching between energized and non-energized states and having a switch self-diagnosis function, a simulation regarding switch self-diagnosis using a battery model for simulating the energy storage device and a powered-unit model for simulating the powered unit; and determining compatibility between the energy storage device and the powered unit based on an execution result of the simulation.

A computer program causes a computer to execute a process of: executing, for a system including an energy storage device and a powered unit driven by power supplied from the energy storage device wherein the energy storage device including a sensor, which depends on a state of a connection destination, and having a sensor calibration function, a simulation regarding sensor calibration using a battery model for simulating the energy storage device and a powered-unit model for simulating the powered unit; and determining compatibility between the energy storage device and the powered unit based on an execution result of the simulation.

A determination device includes: an execution unit that executes, for a system including an energy storage device and a powered unit driven by power supplied from the energy storage device wherein the energy storage device including a switch for switching between energized and non-energized states and having a switch self-diagnosis function, a simulation regarding switch self-diagnosis using a battery model for simulating the energy storage device and a powered-unit model for simulating the powered unit; and a determination unit that determines compatibility between the energy storage device and the powered unit based on an execution result of the simulation.

A determination device includes: an execution unit that executes, for a system including an energy storage device and a powered unit driven by power supplied from the energy storage device wherein the energy storage device including a sensor, which depends on a state of a connection destination, and having a sensor calibration function, a simulation regarding sensor calibration using a battery model for simulating the energy storage device and a powered-unit model for simulating the powered unit and; a determination unit that determines compatibility between the energy storage device and the powered unit based on an execution result of the simulation.

A determination method includes: using a computer, executing, for a system including an energy storage device and a powered unit driven by power supplied from the energy storage device wherein the energy storage device including a switch for switching between energized and non-energized states and having a switch self-diagnosis function, a simulation regarding switch self-diagnosis using a battery model for simulating the energy storage device and a powered-unit model for simulating the powered unit; and determining compatibility between the energy storage device and the powered unit based on an execution result of the simulation.

A determination method includes: using a computer, executing, for a system including an energy storage device and a powered unit driven by power supplied from the energy storage device wherein the energy storage device including a sensor, which depends on a state of a connection destination, and having a sensor calibration function, a simulation regarding sensor calibration using a battery model for simulating the energy storage device and a powered-unit model for simulating the powered unit; and determining compatibility between the energy storage device and the powered unit based on an execution result of the simulation.

According to the present application, the success or failure of relay self-diagnosis and current calibration can be determined by simulation.

DETAILED DESCRIPTION OF VARIOUS EMBODIMENTS

Figure 1:
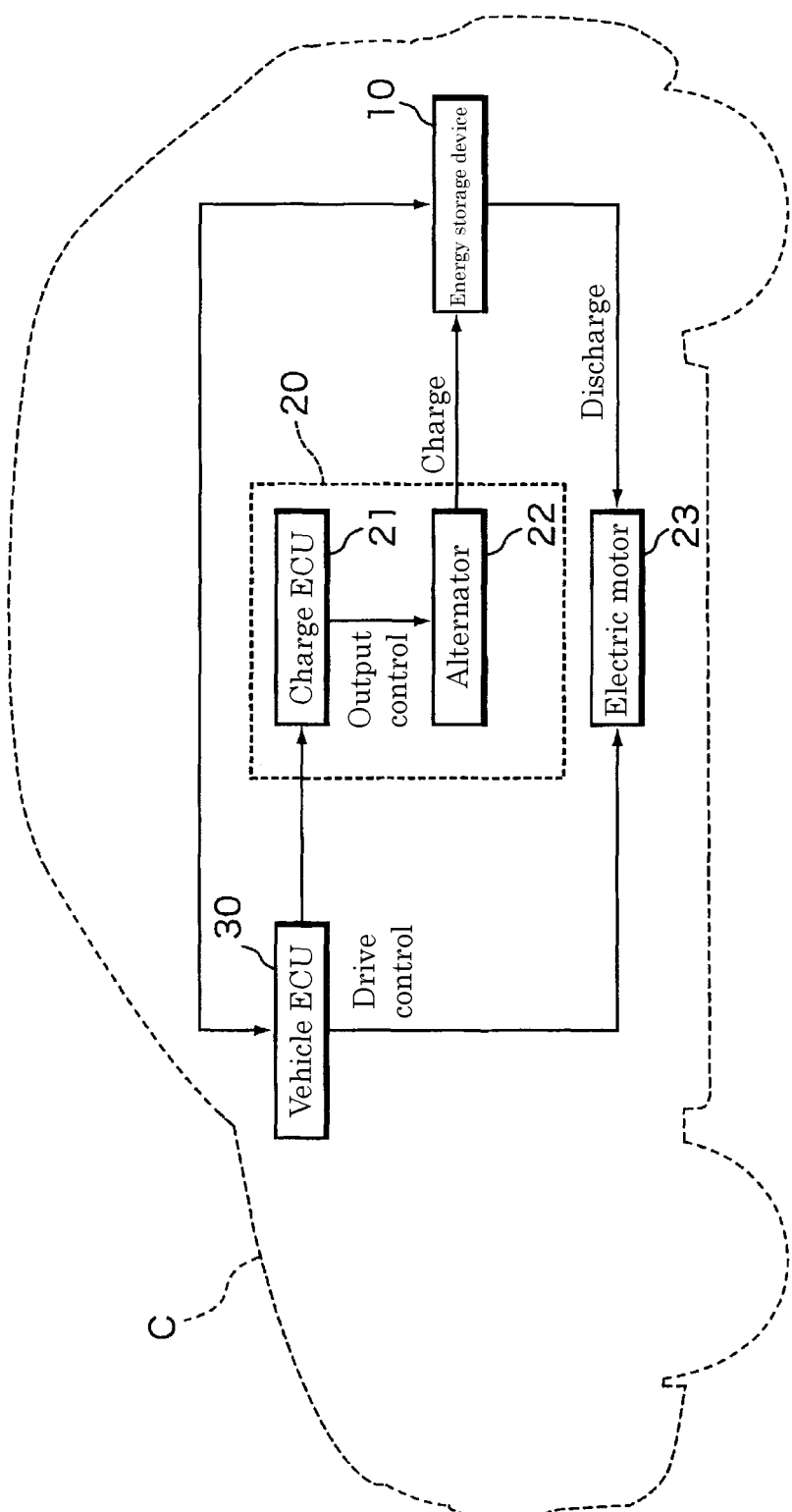
FIG. 1 is a block diagram illustrating the configuration of a control system in a vehicle.

A computer program according to an embodiment causes a computer to execute a process of: executing, for a system including an energy storage device and a powered unit driven by power supplied from the energy storage device wherein the energy storage device including a switch for switching between energized and non-energized states and having a switch self-diagnosis function, a simulation regarding switch self-diagnosis using a battery model for simulating the energy storage device and a powered-unit model for simulating the powered unit; and determining compatibility between the energy storage device and the powered unit based on an execution result of the simulation.

In the present embodiment, the switch included in the energy storage device is a circuit element for cutting off or connecting a charge-discharge path for the energy storage device. An example of the switch is a relay. Alternatively, the switch may be a circuit element that switches between the energized state and the non-energized state, such as a semiconductor element such as a field-effect transistor (FET), breaker, or magnetic contactor. The powered unit is a generic term for devices and systems that can operate on power supplied from an energy storage device. An example of the powered unit is a vehicle. The vehicle is not limited to a four-wheeled vehicle and may be a two-wheeled vehicle. Alternatively, the powered unit may be a moving object such as an automatic guided vehicle (AGV), an unmanned flying object (drone), or an aircraft. The compatibility represents whether the powered unit can be driven in a power supply state during self-diagnosis. In verification using an actual machine or a prototype, when a failure occurs in the switch self-diagnosis, it is necessary to review the specification of the energy storage device or change the type of the energy storage device mounted on the powered unit, so that it takes time to develop. On the other hand, in the present embodiment, it is not necessary to perform verification using an actual machine or a prototype of the energy storage device or the powered unit, and the compatibility between the energy storage device and the powered unit can be determined by simulation regarding self-diagnosis, so that the development time can be shortened. Considering the recent remarkable development progress of electric vehicles, renewable energy, smart grids, and the like, expectations for high-performance and high-safety energy storage devices are great, and there is a great significance of the shortening of the development time utilizing simulation.

The computer program may cause the computer to execute a process of estimating the time required for the switch self-diagnosis by the simulation and determining the compatibility between the energy storage device and the powered unit according to a length of the estimated time. According to this configuration, the compatibility can be determined by focusing on an essential part of diagnosis such as the time required for self-diagnosis without being affected by various elements included in an actual machine or a prototype of a powered unit.

The computer program may cause the computer to execute a process of determining success or failure of the switch self-diagnosis according to a length of a time estimated by the simulation. According to this configuration, the success or failure of the switch self-diagnosis can be determined by focusing on an essential part of diagnosis such as the time required for self-diagnosis without being affected by various elements included in an actual machine or a prototype of a powered unit.

A computer program according to an embodiment causes a computer to execute a process of: executing, for a system including an energy storage device and a powered unit driven by power supplied from the energy storage device wherein the energy storage device including a sensor, which depends on a state of a connection destination, and having a sensor calibration function, a simulation regarding sensor calibration using a battery model for simulating the energy storage device and a powered-unit model for simulating the powered unit; and determining compatibility between the energy storage device and the powered unit based on an execution result of the simulation.

In the present embodiment, the sensor is an element or device for measuring a value that changes according to the state of the powered unit as a connection destination. An example of the sensor is a current sensor. Alternatively, the sensor may be an element or a device such as a voltage sensor or a temperature sensor. The powered unit is a generic term for devices and systems that can operate on power supplied from an energy storage device. An example of the powered unit is a vehicle. The vehicle is not limited to a four-wheeled vehicle and may be a two-wheeled vehicle. Alternatively, the powered unit may be a moving object such as a train, AGV, unmanned flying object (drone), or aircraft. The compatibility represents whether the powered unit can be driven in a power supply state during calibration. In verification using an actual machine or a prototype, when sensor calibration fails, it is necessary to review the specification of the energy storage device or change the type of the energy storage device mounted on the powered unit, so that it takes time to develop. On the other hand, in the present embodiment, it is not necessary to perform verification using an actual machine or a prototype of the energy storage device or the powered unit, and the compatibility between the energy storage device and the powered unit can be determined by simulation regarding sensor calibration, so that the development time can be shortened. Considering the recent remarkable development progress of electric vehicles, renewable energy, smart grids, and the like, expectations for high-performance and high-safety energy storage devices are great, and there is a great significance of the shortening of the development time utilizing simulation.

The computer program may cause the computer to execute a process of: estimating the time during which the energy storage device becomes a zero load by the simulation, and determining the compatibility between the energy storage device and the powered unit according to a length of the estimated time. According to this configuration, the compatibility can be determined by focusing on an essential part of diagnosis such as the time required to make the load become zero without being affected by various elements included in an actual machine or a prototype of a powered unit.

The computer program may cause the computer to execute a process of determining success or failure of the sensor calibration according to a length of a time estimated by the simulation. According to this configuration, the success or failure of sensor calibration can be determined by focusing on an essential part of diagnosis such as the time required to make the load become zero without being affected by various elements included in an actual machine or a prototype of a powered unit.

In the computer program, the powered-unit model may represent the powered unit by a parallel circuit of a capacitance element and a resistance element. According to this configuration, since the powered unit is represented by a simple circuit using only the capacitance element and the resistance element, compatibility can be determined by focusing on a part essential to diagnosis such as the time required for the switch self-diagnosis and the time when the load becomes zero without being affected by various elements included in the actual machine and the prototype of the powered unit. In the computer program, since the powered unit is represented by a simple circuit, the calculation load is reduced.

A determination device according to the present embodiment includes: an execution unit that executes, for a system including an energy storage device and a powered unit driven by power supplied from the energy storage device wherein the energy storage device including a switch for switching between energized and non-energized states and having a switch self-diagnosis function, a simulation regarding switch self-diagnosis using a battery model for simulating the energy storage device and a powered-unit model for simulating the powered unit; and a determination unit that determines compatibility between the energy storage device and the powered unit based on an execution result of the simulation.

In verification using an actual machine or a prototype, when a failure occurs in the switch self-diagnosis, it is necessary to review the specification of the energy storage device or change the type of the energy storage device mounted on the powered unit, so that it takes time to develop. On the other hand, the determination device according to the present embodiment can determine the compatibility between the energy storage device and the powered unit by simulation regarding self-diagnosis without requiring to perform verification using an actual machine or a prototype of the energy storage device or the powered unit, and hence the development time can be shortened. Considering the recent remarkable development progress of electric vehicles, renewable energy, smart grids, and the like, expectations for high-performance and high-safety energy storage devices are great, and there is a great significance of the shortening of the development time utilizing simulation.

A determination device according to the present embodiment includes: an execution unit that executes, for a system including an energy storage device and a powered unit driven by power supplied from the energy storage device wherein the energy storage device including a sensor, which depends on a state of a connection destination, and having a sensor calibration function, a simulation regarding sensor calibration using a battery model for simulating the energy storage device and a powered-unit model for simulating the powered unit; and a determination unit that determines compatibility between the energy storage device and the powered unit based on an execution result of the simulation.

In verification using an actual machine or a prototype, when sensor calibration fails, it is necessary to review the specification of the energy storage device or change the type of the energy storage device mounted on the powered unit, so that it takes time to develop. On the other hand, the determination device according to the present embodiment can determine the compatibility between the energy storage device and the powered unit by simulation regarding sensor calibration without requiring to perform verification using an actual machine or a prototype of the energy storage device or the powered unit, and hence the development time can be shortened. Considering the recent remarkable development progress of electric vehicles, renewable energy, smart grids, and the like, expectations for high-performance and high-safety energy storage devices are great, and there is a great significance of the shortening of the development time utilizing simulation.

A determination method according to the present embodiment includes: using a computer, executing, for a system including an energy storage device and a powered unit driven by power supplied from the energy storage device wherein the energy storage device including a switch for switching between energized and non-energized states and having a switch self-diagnosis function, a simulation regarding switch self-diagnosis using a battery model for simulating the energy storage device and a powered-unit model for simulating the powered unit; and determining compatibility between the energy storage device and the powered unit based on an execution result of the simulation.

In verification using an actual machine or a prototype, when a failure occurs in the switch self-diagnosis, it is necessary to review the specification of the energy storage device or change the type of the energy storage device mounted on the powered unit, so that it takes time to develop. On the other hand, the determination method according to the present embodiment can determine the compatibility between the energy storage device and the powered unit by simulation regarding self-diagnosis without requiring to perform verification using an actual machine or a prototype of the energy storage device or the powered unit, and hence the development time can be shortened. Considering the recent remarkable development progress of electric vehicles, renewable energy, smart grids, and the like, expectations for high-performance and high-safety energy storage devices are great, and there is a great significance of the shortening of the development time utilizing simulation.

A determination method according to the present embodiment includes: using a computer, executing, for a system including an energy storage device and a powered unit driven by power supplied from the energy storage device wherein the energy storage device including a sensor, which depends on a state of a connection destination, and having a sensor calibration function, a simulation regarding sensor calibration using a battery model for simulating the energy storage device and a powered-unit model for simulating the powered unit; and determines compatibility between the energy storage device and the powered unit based on an execution result of the simulation.

In verification using an actual machine or a prototype, when sensor calibration fails, it is necessary to review the specification of the energy storage device or change the type of the energy storage device mounted on the powered unit, so that it takes time to develop. On the other hand, the determination method according to the present embodiment can determine the compatibility between the energy storage device and the powered unit by simulation regarding sensor calibration without requiring to perform verification using an actual machine or a prototype of the energy storage device or the powered unit, and hence the development time can be shortened. Considering the recent remarkable development progress of electric vehicles, renewable energy, smart grids, and the like, expectations for high-performance and high-safety energy storage devices are great, and there is a great significance of the shortening of the development time utilizing simulation.

An embodiment of the present invention will exemplify a case in which the present invention is applied to a charge system mounted on a vehicle such as a hybrid electric vehicle (HEV) or an electric vehicle (EV).

FIG. 1 is a block diagram illustrating the configuration of a control system in a vehicle. A vehicle C includes, as the components of a control system, an energy storage device 10, a charge system 20 for charging the energy storage device 10, and a vehicle electronic control unit (ECU) that executes control of the entire vehicle. In the present embodiment, the vehicle C is an example of a powered unit driven by power supplied from the energy storage device 10. The energy storage device 10, the charge system 20, and the vehicle ECU 30 are communicably connected to each other via an in-vehicle line such as a controller area network (CAN) or a local interconnect network (LIN). In the present embodiment, the vehicle ECU 30 monitors the traveling state of the vehicle C, the charge state of the energy storage device 10, and the like and executes control or the like for switching charging and discharging of the energy storage device according to the traveling state of the vehicle C and the charge state of the energy storage device 10.

Figure 2:
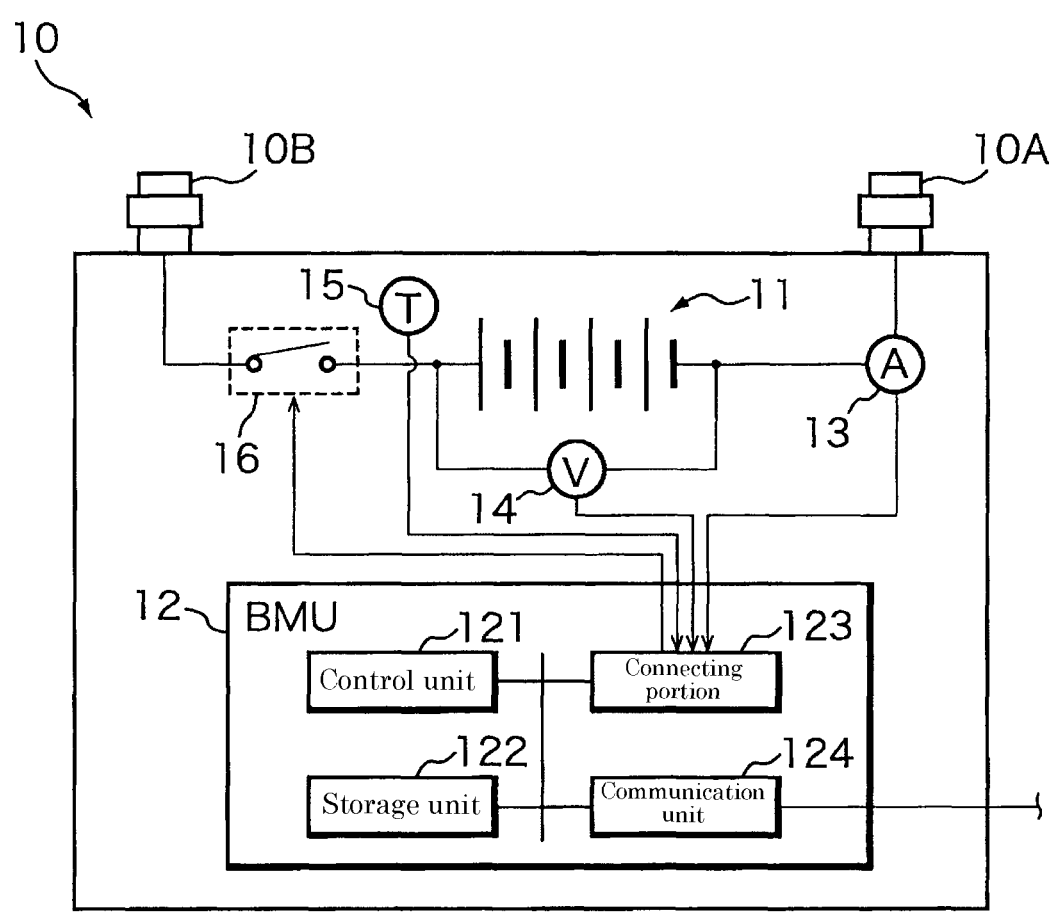
FIG. 2 is a block diagram illustrating the internal configuration of an energy storage device.

The energy storage device 10 includes an energy storage device 11 and a battery-management unit (BMU) 12 (see FIG. 2). The energy storage device 11 includes, for example, an assembled battery formed by connecting a plurality of batteries in series. The energy storage device 11 is charged by power supplied from the charge system 20 of the vehicle C and supplies power to a load in response to a control command from the vehicle ECU 30. An example of the load to which the energy storage device 11 supplies power is an electric motor 23 that generates a drive torque for causing the vehicle C to travel. Other examples of the load include various accessories included in the vehicle C, such as a headlight, a turn signal lamp, an in-vehicle lamp, and a power window. The BMU 12 has a function of managing the energy storage device 10. The BMU 12 has a function of estimating the state of the energy storage device 10, a function of detecting abnormality in the energy storage device 10, and the like and notifies the vehicle ECU 30 of information regarding the estimated state of the energy storage device 10, information regarding the detected abnormality, and the like.

The charge system 20 includes a charge ECU 21 and an alternator 22. The alternator 22 is a generator coupled to the output shaft of an engine (not illustrated) and is configured to generate power by the rotation of the output shaft. The power obtained by the power generation of the alternator 22 is supplied to the loads included in the energy storage device 10 and the vehicle C under the control of the charge ECU 21. The alternator 22 performs regenerative control to generate power when the vehicle C is decelerating, thereby applying a braking force to the vehicle C as a load with respect to the rotation of the engine output shaft, and supplying the generated power to the loads provided in the energy storage device 10 and the vehicle C.

FIG. 2 is a block diagram illustrating the internal configuration of energy storage device 10. The energy storage device 10 includes a current sensor 13, a voltage sensor 14, a temperature sensor 15, and a relay 16 in addition to the energy storage device 11 and the BMU 12. The energy storage device 11 includes, for example, a plurality of lithium ion secondary batteries (battery cells) connected in series.

The current sensor 13 is provided between the energy storage device 11 and a negative electrode terminal 10A and measures a current flowing into the energy storage device 11. In the present embodiment, the current sensor 13 is an example of a sensor that does not depend on the state of the connection destination. The current sensor 13 outputs a measurement result to the BMU 12.

The voltage sensor 14 is connected in parallel to the energy storage device 11 and measures a voltage across both ends of the energy storage device 11. The voltage sensor 14 outputs a measurement result to the BMU 12.

The temperature sensor 15 is provided inside or outside the energy storage device 10 and measures a temperature. A plurality of temperature sensors 15 may be provided. The temperature measured by the temperature sensor 15 is, for example, the temperature of the energy storage device 11. In this case, the temperature sensor 15 is provided near the energy storage device 11 (inside the energy storage device). The temperature measured by the temperature sensor 15 may be a temperature of an environment (environmental temperature) in which the energy storage device 10 is installed. In this case, the temperature sensor 15 is provided near the energy storage device 10. In the following description, the temperature of the energy storage device 11 is referred to as the temperature of the energy storage device 10 without distinguishing the temperature of the energy storage device from the environmental temperature. The temperature sensor 15 outputs a measurement result to the BMU 12.

The relay 16 is provided between the energy storage device 11 and a positive electrode terminal 10B and is a circuit element for cutting off or connecting a charge-discharge path of the energy storage device 11 according to a control command from the BMU 12. In the present embodiment, the relay 16 is an example of a switch that switches between the energized state and the non-energized state of the energy storage device 10. When the energy storage device 10 normally functions, the charge-discharge path is connected, and the energy storage device 11 can be charged from the outside, and power can be supplied (discharged) from the energy storage device 11 to the load. On the other hand, when an abnormality such as overcharge or overdischarge is detected in the energy storage device 10, the charge-discharge path is cut off by a control command from the BMU 12, and the charge of the energy storage device 11 and the power supply (discharge) to the load are stopped.

In the present embodiment, the relay 16 is an example of a circuit element for cutting off or connecting the charge-discharge path. Alternatively, the charge-discharge path may be cut off or connected using a semiconductor switch such as an FET.

The BMU 12 is an apparatus for managing the state of the energy storage device 10 and includes, for example, a control unit 121, a storage unit 122, a connecting portion 123, and a communication unit 124. The control unit 121 includes a central processing unit (CPU), a read only memory (ROM), and a random access memory (RAM). The CPU included in the control unit 121 executes a control program stored in advance in the ROM to implement a function of estimating the state of the energy storage device 10, a function of detecting an abnormality in the energy storage device 10, and the like. The RAM temporarily stores various types of information generated during the execution of calculation by the CPU. The storage unit 122 includes an electronically erasable programmable read only memory (EEPROM) and stores data necessary for control and the like. The current sensor 13, the voltage sensor 14, the temperature sensor 15, the relay 16, and the like are connected to the connecting portion 123. The communication unit 124 is communicably connected to the vehicle ECU 30 via an in-vehicle line such as CAN or LIN.

The control unit 121 of the BMU 12 acquires the current value measured by the current sensor 13, the voltage value measured by the voltage sensor 14, and the temperature measured by the temperature sensor 15 via the connecting portion 123 and calculates the state of charge (SOC), and the open circuit voltage (OCV) of the energy storage device 10 based on these data. For example, a current integration method is used to estimate the SOC. The current integration method is a method of estimating an SOC by constantly measuring the charge-discharge current of the energy storage device 10 by the current sensor 13, obtaining the amount of power flowing in and out of the energy storage device 10, and adding or subtracting this from the initial capacitance value. Since the OCV is correlated with the SOC, the OCV can be estimated by estimating the SOC. The control unit 121 notifies the vehicle ECU 30 of the estimated SOC and OCV information via the communication unit 124. In addition, when the estimated OCV increases to a predetermined upper limit value or more or decreases to a predetermined lower limit value, the control unit 121 determines that an abnormality in the energy storage device 10 is detected and outputs a control command to cut off the charge-discharge path to the relay 16.

When the relay 16 fails and does not open, the energy storage device 10 cannot be protected from abnormality. Therefore, the BMU 12 performs failure diagnosis (relay self-diagnosis) by opening and closing the relay 16. For example, the BMU 12 opens the relay 16 and measures the current value by the current sensor 13. If the relay 16 has not failed, since the relay 16 opens, the current value measured by the current sensor 13 should be 0 A (0 ampere). On the other hand, when the relay 16 has failed, the relay 16 does not open, and thus the current value measured by the current sensor 13 is larger than 0 A. The control unit 121 of the BMU 12 determines that the relay 16 has not failed when the current value measured by the current sensor 13 is 0 A and determines that the relay 16 has failed when the current value is greater than 0 A.

The control unit 121 of the BMU 12 calibrates the current value measured by the current sensor 13. When there is a dark current, there is a possibility that erroneous diagnosis occurs in the relay self-diagnosis described above, or the SOC estimation accuracy deteriorates. Accordingly, the control unit 121 of the BMU 12 measures a current value by the current sensor 13 in a state in which the relay 16 opens and performs the calibration of the current sensor 13 so that the current value at this time becomes 0 A.

In the present embodiment, the energy storage device 10 is configured to incorporate the BMU 12. Alternatively, the BMU 12 may be provided outside the energy storage device 10.

The vehicle C is developed and manufactured by, for example, a vehicle manufacturer, and the energy storage device 10 is developed and manufactured by, for example, a battery manufacturer. If the specification of the vehicle C and the specification of the energy storage device 10 incorporated in the vehicle C do not match, relay self-diagnosis and current calibration in the energy storage device 10 may not be normally performed. In a case in which the above-described defect is found at a point of time when the energy storage device 10 is incorporated in the vehicle C and the entire vehicle is comprehensively verified, it is necessary to review the specification, or it is necessary to change the type of the energy storage device 10 incorporated in the vehicle C. Therefore, the agreement of the specification cannot be reached at an early stage.

In the present embodiment, a computer (the development support device 100: see FIG. 3) independent of vehicle C executes a simulation using a model that simulates energy storage device 10 and a model that simulates the vehicle C and determines the compatibility between the energy storage device 10 and the vehicle C. In the present embodiment, it is determined whether or not the vehicle C can be driven in the power supply state during diagnosis or calibration by determining whether or not relay self-diagnosis and current calibration are successful.

Figure 3:
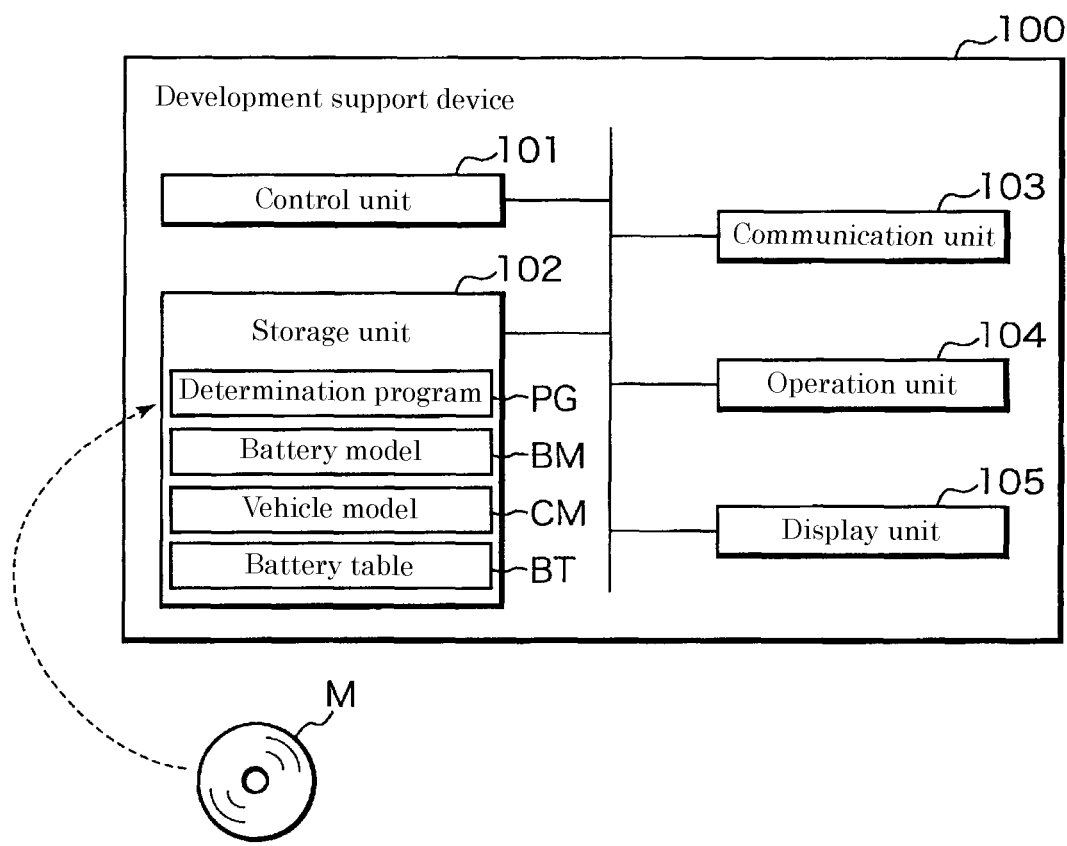
FIG. 3 is a block diagram illustrating the internal configuration of a development support device according to the present embodiment.

FIG. 3 is a block diagram illustrating the internal configuration of a development support device 100 according to the present embodiment. The development support device 100 is a general-purpose or dedicated computer and includes a control unit 101, a storage unit 102, a communication unit 103, an operation unit 104, and a display unit 105.

The control unit 101 includes a CPU, a ROM, and a RAM. The CPU included in the control unit 101 expands various computer programs stored in the ROM or the storage unit 102 on the RAM and executes the programs to cause the entire apparatus to function as the determination device according to the present application.

The control unit 101 is not limited to the above configuration and may be any processing circuit or arithmetic circuit including a plurality of CPUs, multi-core CPUs, graphics processing units (GPUs), microcomputers, and volatile or nonvolatile memories. In addition, the control unit 101 may have functions such as a timer that measures the elapsed time from when a measurement start instruction is given to when a measurement end instruction is given, a counter that counts numbers, and a clock that outputs date and time information.

The storage unit 102 includes a storage device using a hard disk drive (HDD), a solid state drive (SSD), and the like. The storage unit 102 stores various computer programs executed by the control unit 101, data necessary for executing the computer programs, and the like. The computer program stored in the storage unit 102 includes a determination program PG for determining the success or failure of relay self-diagnosis and current calibration by simulation using a battery model BM that simulates the energy storage device 10 and a vehicle model CM that simulates the vehicle C. The determination program PG may be a single computer program or a program group including a plurality of programs.

The computer program stored in the storage unit 102 is provided, for example, by a non-transitory recording medium M in which the computer program is recorded in a readable manner. The recording medium M is a portable memory such as a CD-ROM, a universal serial bus (USB) memory, a secure digital (SD) card, a micro SD card, and a compact flash (registered trademark). In this case, the control unit 101 may read a computer program from the recording medium M using a reading device (not illustrated) and install the read computer program in the storage unit 102. Alternatively, the computer program stored in the storage unit 102 may be provided by communication via the communication unit 103. In this case, the control unit 101 may acquire the computer program via the communication unit 103 and install the acquired computer program in the storage unit 102.

The storage unit 102 stores various data in addition to the computer program. For example, the storage unit 102 stores the battery model BM that simulates the energy storage device 10 and the vehicle model CM that simulates the vehicle C. The battery model BM includes equivalent circuits of the energy storage device 11 and the relay 16. The storage unit 102 stores information regarding the circuit configuration of the equivalent circuit, a value of each element constituting the equivalent circuit, and the like. The battery model BM further includes a BMU model that simulates the operation of the BMU 12. In the present embodiment, the BMU model only needs to be able to simulate the logics of relay self-diagnosis and current calibration. The vehicle model CM is expressed by an equivalent circuit of the vehicle C. The storage unit 102 stores information regarding the circuit configuration of the equivalent circuit, a value of each element constituting the equivalent circuit, and the like.

The storage unit 102 may include a battery table BT that stores information of the energy storage device 10 in association with an identifier for identifying the energy storage device 10. The battery information registered in the battery table BT includes, for example, the information of the positive electrode and the negative electrode, the information of the electrolyte solution, and the information on the tabs. The information of the positive electrode and the negative electrode is information such as the active material names, thicknesses, widths, depths, and open circuit potentials of the positive electrode and the negative electrode. The information of the electrolyte solution and the tabs is information such as ion species, transport number, diffusion coefficient, and conductivity. In addition, the information registered in the battery table BT may include the information of components and the like configuring the energy storage device 10. The information stored in the battery table BT is used as part of the parameters when the above-described simulation is executed.

The communication unit 103 includes a communication interface for communicating with an external device via a communication network (not illustrated). The external device is, for example, an information processing terminal such as a computer or smartphone used by the user. When information to be transmitted to the external device is input from the control unit 101, the communication unit 103 transmits the input information to the external device and outputs information from the external device received via the communication network to the control unit 101.

The communication unit 103 may be configured to be able to communicate with the BMU 12 included in the vehicle ECU 30 and the energy storage device 10. The control unit 101 may acquire information regarding the traveling state of the vehicle C, various measurement values measured by the energy storage device 10, and the like via the communication unit 103 and execute simulation based on the acquired information.

The operation unit 104 includes an input interface such as a keyboard, a mouse, and a touch panel and receives an operation by the user. The display unit 105 includes a liquid crystal display device and displays information to be notified to the user. In the present embodiment, the development support device 100 includes the operation unit 104 and the display unit 105. However, the operation unit 104 and the display unit 105 are not essential and may be configured to receive an operation via a computer connected to the outside of development support device 100 and output information to be notified to the external computer.

The configuration of the simulation model will be described below.

Figure 4:
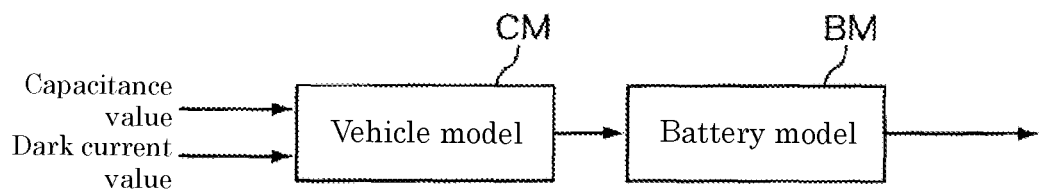
FIG. 4 is a block diagram illustrating the configuration of a simulation model used by the development support device.

FIG. 4 is a block diagram illustrating the configuration of a simulation model used by the development support device 100. The development support device 100 estimates the behavior of the vehicle system by executing a simulation using the vehicle model CM that simulates the vehicle C and the battery model BM that simulates the energy storage device 10 and determines the success or failure of relay self-diagnosis and current calibration based on the estimation result.

In the present embodiment, since it is sufficient that the capacitance value and the dark current of the vehicle C can be simulated, the vehicle model CM is represented by, for example, an RC parallel circuit of a capacitance element and a resistance element. The value of the capacitance element in the RC parallel circuit represents the capacitance value of the vehicle C, and the current flowing through the resistance element represents the dark current.

Figure 5:
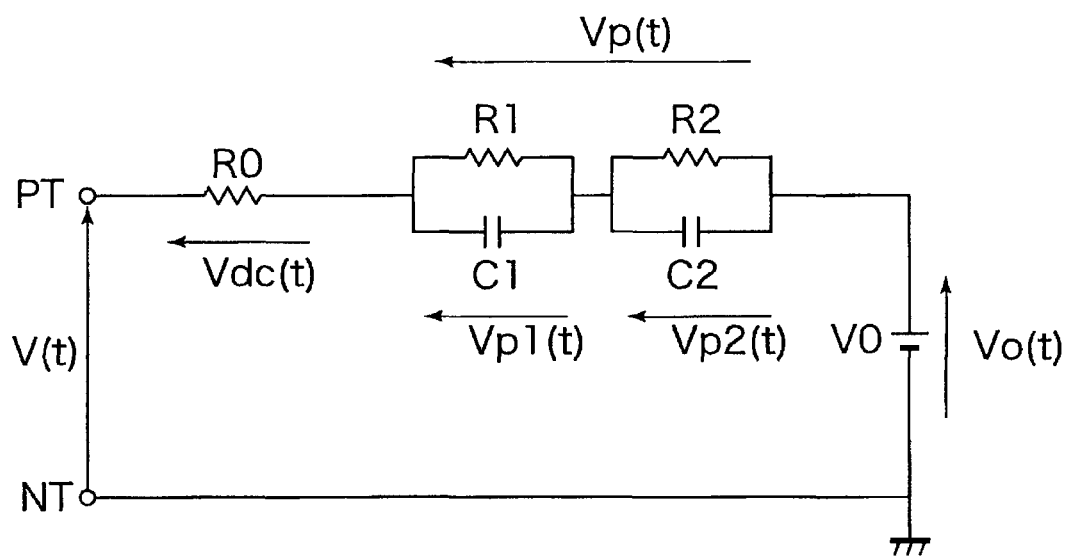
FIG. 5 is a circuit diagram illustrating an example of an equivalent circuit simulating an energy storage device.

The battery model BM is a model that simulates the energy storage device 10 and includes an equivalent circuit that simulates the energy storage device 11 and a logic circuit that simulates the logics of relay self-diagnosis and current calibration executed by the BMU 12. FIG. 5 is a circuit diagram illustrating an example of an equivalent circuit simulating the energy storage device 11. The equivalent circuit model of the energy storage device 11 is represented by, for example, a resistance element R0, a first RC parallel circuit formed by connecting a resistance element R1 and a capacitance element C1 in parallel, a second RC parallel circuit formed by connecting a resistance element R2 and a capacitance element C2 in parallel, and a constant voltage source V0.

The resistance element R0 represents a DC resistance component (DC impedance) of the energy storage device 11. The DC resistance component of the energy storage device 11 corresponds to, for example, the resistance of the electrode of the energy storage device 11. The resistance value of the resistance element R0 is a value that changes depending on a discharge current, a charge voltage, an SOC, a temperature, and the like. When the resistance value of the resistance element R0 is determined, the voltage generated across the resistance element R0 when a current I(t) flows through the equivalent circuit model can be calculated. The voltage generated across the resistance element R0 is defined as a DC resistance voltage Vdc(t).

The two RC parallel circuits are circuit elements for describing the transient polarization characteristics of the energy storage device 10. The respective values of the resistance element R1 and the capacitance element C1 constituting the first RC parallel circuit and the resistance element R2 and the capacitance element C2 constituting the second RC parallel circuit are given as values varying according to the SOC of the energy storage device 10. When these values are determined, impedances in the first RC parallel circuit and the second RC parallel circuit are determined. When the impedance is determined, the voltage (polarization voltage Vp(t)) generated in the first RC parallel circuit and the second RC parallel circuit when the current I(t) flows through the equivalent circuit model can be calculated. The polarization voltage Vp(t) is the total voltage of a polarization voltage Vp1($t$) generated in the first RC parallel circuit and a polarization voltage Vp2($t$) generated in the second RC parallel circuit.

Assume that the time constant in the first RC parallel circuit is τ1, and the time constant in the second RC parallel circuit is τ2. The time constant τ1 is determined as a value obtained by multiplying the resistance value of the resistance element R1 and the capacitance value of the capacitance element C1 constituting the first RC parallel circuit. The time constant τ1 is reflected in a temporal change in the polarization voltage Vp1(t) generated in the first RC parallel circuit. Similarly, the time constant τ2 is determined as a value obtained by multiplying the resistance value of the resistance element R2 and the capacitance value of the capacitance element C2 constituting the second RC parallel circuit. The time constant τ2 is reflected in a temporal change in the polarization voltage Vp2(t) generated in the second RC parallel circuit. Changing the time constants τ1 and τ2 makes it possible to express various phenomena occurring in the energy storage device 11.

The constant voltage source V0 is a voltage source that outputs a DC voltage. The voltage output from the constant voltage source V0 represents an open circuit voltage (OCV) of the energy storage device 11 and is referred to as Vo(t). The open circuit voltage Vo(t) is given as a function of SOC, temperature, or the like.

A terminal voltage V(t) between a positive electrode terminal PT and a negative electrode terminal NT is given as follows, using the DC resistance voltage Vdc(t), the polarization voltage Vp(t), and the open circuit voltage Vo(t), $$V(t)=Vdc(t)+Vp(t)+Vo(t).$$

The value of each element configuring the equivalent circuit model of the energy storage device 11 is set, for example, based on an actual measurement result in consideration of a relationship such as current and SOC.

The control unit 101 of the development support device 100 executes a simulation using the battery model BM and the vehicle model CM, determines the success or failure of relay self-diagnosis and current calibration, and outputs the determination result. For example, depending on the magnitude of the capacitance value and the dark current value set in the vehicle model CM, there is a case in which the time required for relay self-diagnosis is long, or there is a case in which current calibration cannot be performed because the time to become a 0 load (a state in which the relay 16 is opened) is short. The control unit 101 obtains the time required for relay self-diagnosis and the time during which a 0 load is set by simulation. The control unit 101 compares the obtained time with a preset threshold to determine success or failure of relay self-diagnosis and current calibration.

Figure 6:
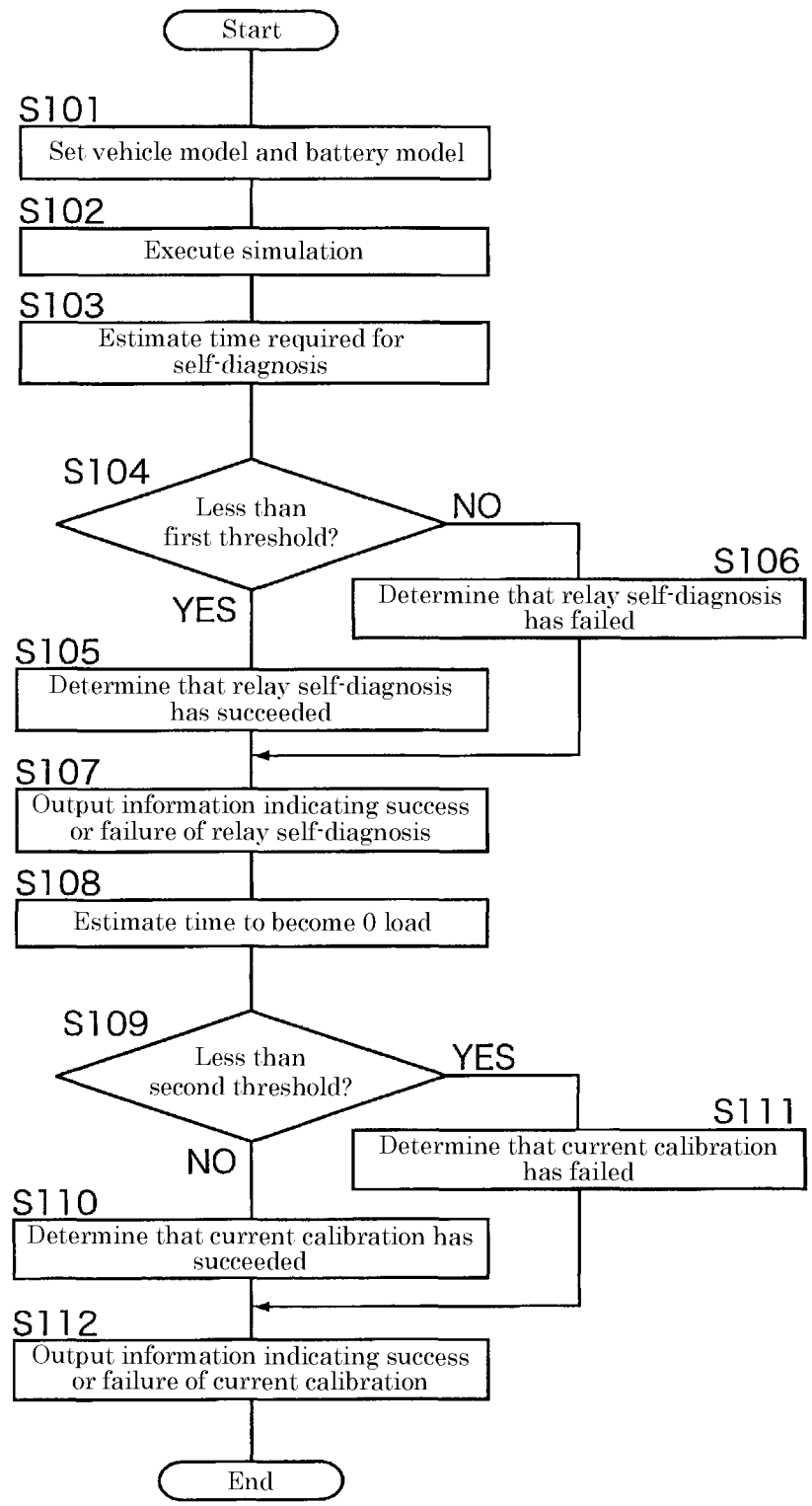
FIG. 6 is a flowchart illustrating a procedure of processing executed by the development support device.

FIG. 6 is a flowchart illustrating a procedure of processing executed by the development support device 100. The control unit 101 of the development support device 100 sets the vehicle model CM that simulates the vehicle C and the battery model BM that simulates the energy storage device 10 mounted on the vehicle C (step S101). At this time, the values of the capacitance elements and the resistance elements configuring the vehicle model CM, the dark current value of the vehicle C, the values of the elements included in the equivalent circuit of the energy storage device 11, and the like are set. These values may be set in advance and stored in the storage unit 102 or may be received via the operation unit 104 when simulation is executed.

Next, the control unit 101 executes a simulation using the vehicle model CM and the battery model BM and estimates the behavior of the vehicle system (step S102).

In a process of estimating the behavior of the vehicle system, the control unit 101 estimates the time required for self-diagnosis of relay 16 included in energy storage device 10 (step S103) and determines whether the estimated time is less than the first threshold (step S104). The first threshold may be set in advance and stored in the storage unit 102.

Upon determining that the estimated time is less than the first threshold (S104: YES), the control unit 101 determines that the relay self-diagnosis has succeeded since the diagnosis is completed within the set time (step S105). Upon determining that the estimated time is equal to or more than the first threshold (S104: NO), the control unit 101 determines that the relay self-diagnosis has failed since the diagnosis is not completed within the set time (step S106).

The control unit 101 outputs information regarding the success or failure of relay self-diagnosis based on the determination result (step S107). The information regarding the success or failure of relay self-diagnosis may be displayed on the display unit 105 or may be notified to the outside via the communication unit 103.

In a process of estimating the behavior of the vehicle system, the control unit 101 estimates the time during which the energy storage device 10 becomes a 0 load (step S108) and determines whether the estimated time is less than the second threshold (step S109). The second threshold may be set in advance independently of the first threshold and stored in the storage unit 102.

When determining that the estimated time is equal to or more than the second threshold (S109: NO), the control unit 101 can measure a current (dark current) flowing at the time of 0 load and hence determines that the current calibration has succeeded (step S110). Upon determining that the estimated time is less than the second threshold (S109: YES), the control unit 101 cannot measure a current (dark current) flowing at the time of 0 load and hence determines that the current calibration has failed (step S111).

The control unit 101 outputs information related to the success or failure of the current calibration on the basis of the determination result (step S112). The information regarding the success or failure of current calibration may be displayed on the display unit 105 or may be notified to the outside via the communication unit 103.

In the flowchart illustrated in FIG. 6, for the sake of convenience, after the success or failure of the relay self-diagnosis is determined, the success or failure of the current calibration is determined. Alternatively, the control unit 101 may determine the success or failure of the relay self-diagnosis after determining the success or failure of the current calibration. The control unit 101 may perform either relay self-diagnosis or current calibration.

As described above, in the present embodiment, the behavior of the vehicle system is estimated by executing the simulation using the battery model BM that simulates the energy storage device 10 and the vehicle model CM that simulates the vehicle C, and the success or failure of the relay self-diagnosis and the current calibration is determined based on the estimation result. Accordingly, the success or failure of relay self-diagnosis and current calibration can be determined by simulation without requiring to perform verification using actual machines or prototypes of the energy storage device 10 and the vehicle C. As a result, the development support device 100 can determine the specifications of the vehicle C and the energy storage device 10 mounted on the vehicle C at an initial stage of product development.

It is to be understood that the embodiments disclosed herein are illustrative in all respects and not restrictive. The scope of the present invention is defined not by the meanings described above but by the claims and is intended to include meanings equivalent to the claims and all modifications within the scope.

For example, in the present embodiment, the configuration in which the energy storage device 10 includes the relay 16 has been described as an example of the switch for switching between the energized state and the non-energized state. Alternatively, the switch may be a semiconductor element such as an FET, breaker, magnetic contactor, or the like. In the present embodiment, the configuration in which the energy storage device 10 includes the current sensor 13 has been described as an example of the sensor depending on the state of the connection destination. Alternatively, the sensor may be a voltage sensor 14, a temperature sensor 15, or the like.

For example, in the present embodiment, as described above, the energy storage device 10 is a power source for a vehicle. The vehicle is not limited to a four-wheeled vehicle and may be a two-wheeled vehicle. Alternatively, the vehicle may be a train or a moving object such as an AGV, unmanned flying object (drone), or aircraft. The energy storage device 10 may be a high-voltage power source (several hundred V) for driving the vehicle, an auxiliary battery (12 V or 24 V) that supplies power other than for driving, an engine starting battery (12 V or 24 V), or a mild hybrid battery (48 V). Examples of the vehicle charge system include, but are not limited to, regenerative power recovered at the time of deceleration of the vehicle, solar power generation mounted on a roof or the like, a 100 V power source or a 200 V quick charger for parking and charging, and an energy storage system incorporating a reused battery. Alternatively, the energy storage device 10 may be a power source for electronic equipment or a power source for energy storage. In these cases, the development support device 100 may determine the compatibility between the charge system and the energy storage device included in electronic equipment or energy storage facilities.

The present embodiment has exemplified the configuration of the energy storage device 11 including the plurality of lithium ion secondary batteries. Alternatively, the energy storage device 10 may be a module in which a plurality of cells are connected, a bank in which a plurality of modules are connected, a domain in which a plurality of banks are connected, or the like. In addition, instead of the lithium ion secondary battery, any battery such as an all-solid-state lithium ion battery, a zinc-air battery, a sodium ion battery, or a lead-acid battery may be adopted.

The invention claimed is:

1. A computer program for causing a computer to execute a process of:

executing, for a system including an energy storage device and a powered unit driven by power supplied from the energy storage device wherein the energy storage device including a switch for switching between energized and non-energized states and having a switch self-diagnosis function, a simulation regarding switch self-diagnosis using a battery model for simulating the energy storage device and a powered-unit model for simulating the powered unit;

determining compatibility between the energy storage device and the powered unit based on an execution result of the simulation;

estimating a time required for the switch self-diagnosis by the simulation, and determining the compatibility between the energy storage device and the powered unit according to a length of the estimated time.

2. The computer program according to claim 1, further causing the computer to execute a process of determining success or failure of the switch self-diagnosis according to a length of a time estimated by the simulation.

3. A computer program for causing a computer to execute a process of:

executing, for a system including an energy storage device and a powered unit driven by power supplied from the energy storage device wherein the energy storage device including a sensor, which depends on a stage of a connection destination, and having a sensor calibration function, a simulation regarding sensor calibration using a battery model for simulating the energy storage device and a powered-unit model for simulating the powered unit; and determining compatibility between the energy storage device and the powered unit based on an execution result of the simulation.

4. The computer program according to claim 3, further causing the computer to execute a process of estimating a time during which the energy storage device becomes a zero load by the simulation, and determining the compatibility between the energy storage device and the powered unit according to a length of the estimated time.

5. The computer program according to claim 3, further causing the computer to execute a process of determining success or failure of the sensor calibration according to a length of a time estimated by the simulation.

6. The computer program according to claim 1, wherein the powered-unit model represents the powered unit by a parallel circuit of a capacitance element and a resistance element.

7. A determination device comprising:

an execution unit that executes, for a system including an energy storage device and a powered unit driven by power supplied from the energy storage device wherein the energy storage device including a switch for switching between energized and non-energized states and having a switch self-diagnosis function, a simulation regarding switch self-diagnosis using a battery model for simulating the energy storage device and a powered-unit model for simulating the powered unit and estimating a time required for the switch self-diagnosis by the simulation; and a determination unit that determines compatibility between the energy storage device and the powered unit based on an execution result of the simulation.

8. A determination device comprising:

an execution unit that executes, for a system including an energy storage device and a powered unit driven by power supplied from the energy storage device wherein the energy storage device including a sensor, which depends on a state of a connection destination, and having a sensor calibration function, a simulation regarding sensor calibration using a battery model for simulating the energy storage device and a powered-unit model for simulating the powered unit; and a determination unit that determines compatibility between the energy storage device and the powered unit based on an execution result of the simulation.

9. The computer program according to claim 4, further causing the computer to execute a process of determining success or failure of the sensor calibration according to a length of a time estimated by the simulation.

10. The computer program according to claim 3, wherein the powered-unit model represents the powered unit by a parallel circuit of a capacitance element and a resistance element.

11. A computer program for causing a computer to execute a process of:
   executing, for a system including an energy storage device and a powered unit driven by power supplied from the energy storage device wherein the energy storage device including a switch for switching between energized and non-energized states and having a switch self-diagnosis function, a simulation regarding switch self-diagnosis using a battery model for simulating the energy storage device and a powered-unit model for simulating the powered unit;
   determining compatibility between the energy storage device and the powered unit based on an execution result of the simulation; and
   determining success or failure of the switch self-diagnosis according to a length of a time estimated by the simulation.

12. The computer program according to claim 11, wherein the powered-unit model represents the powered unit by a parallel circuit of a capacitance element and a resistance element.

13. A determination device comprising:
   an execution unit that executes, for a system including an energy storage device and a powered unit driven by power supplied from the energy storage device wherein the energy storage device including a switch for switching between energized and non-energized states and having a switch self-diagnosis function, a simulation regarding switch self-diagnosis using a battery model for simulating the energy storage device and a powered-unit model for simulating the powered unit and estimating a time required for the switch self-diagnosis by the simulation; and
   a determination unit that:
      determines compatibility between the energy storage device and the powered unit based on an execution result of the simulation; and
      determines success or failure of the switch self-diagnosis according to a length of a time estimated by the simulation.

* * * * *